US009278678B2

(12) United States Patent
Rudolph et al.

(10) Patent No.: US 9,278,678 B2
(45) Date of Patent: Mar. 8, 2016

(54) MODULAR ELECTRONIC BRAKE VALVE FOR AIR BRAKES VEHICLES

(75) Inventors: Robert Rudolph, Kansas City, MO (US); Joe Hoover, Kansas City, MO (US); David G. Engelbert, Kansas City, MO (US)

(73) Assignee: HALDEX BRAKE CORPORATION, Kansas City, MO (US)

( * ) Notice: Subject to any disclaimer, the term of this patent is extended or adjusted under 35 U.S.C. 154(b) by 678 days.

(21) Appl. No.: 11/153,293

(22) Filed: Jun. 15, 2005

(65) Prior Publication Data

US 2006/0284480 A1    Dec. 21, 2006

(51) Int. Cl.
  *B60T 8/36* (2006.01)
  *B60T 13/26* (2006.01)
  *F15B 13/08* (2006.01)

(52) U.S. Cl.
  CPC ............. *B60T 13/261* (2013.01); *B60T 8/3675* (2013.01); *B60T 8/3685* (2013.01); *F15B 13/0832* (2013.01); *Y10T 137/87885* (2013.01)

(58) Field of Classification Search
  CPC ... B60T 8/3675; B60T 8/3685; B60T 13/261; F15B 13/0832; Y10T 137/87885
  USPC ................ 303/127, 128, 118.1, 119.1, 119.2, 303/DIG. 10
  See application file for complete search history.

(56) References Cited

U.S. PATENT DOCUMENTS

| 3,244,193 | A |   | 4/1966  | Loveless et al. |         |
|-----------|---|---|---------|-----------------|---------|
| 3,756,274 | A | * | 9/1973  | Wolfgramm       | 137/561 R |
| 3,826,283 | A | * | 7/1974  | Klimek          | 137/627.5 |
| 3,934,605 | A | * | 1/1976  | Legris          | 137/271 |
| 4,050,746 | A | * | 9/1977  | Durling         | 303/40  |
| 4,128,276 | A |   | 12/1978 | Beck et al.     | 303/13  |
| 4,139,020 | A |   | 2/1979  | Sebo            | 137/454.2 |
| 4,223,953 | A | * | 9/1980  | Cruse           | 303/2   |
| 4,330,157 | A |   | 5/1982  | Sebo            | 303/7   |
| 5,061,015 | A | * | 10/1991 | Cramer et al.   | 303/7   |
| 5,178,191 | A |   | 1/1993  | Schaefer        | 137/884 |

(Continued)

FOREIGN PATENT DOCUMENTS

JP    7033004 A    2/1995
JP    11044374 A   2/1999

(Continued)

OTHER PUBLICATIONS

European Search Report, Sep. 15, 2006, 5 pages.

*Primary Examiner* — Thomas Irvin

(74) *Attorney, Agent, or Firm* — St. Onge Steward Johnston & Reens LLC

(57) ABSTRACT

A vehicle brake system includes a source of fluid pressure adapted to supply a braking force to at least one brake actuator and a modular valve unit fluidly coupling the brake actuator to the source of fluid pressure. The modular valve unit includes a plurality of valve modules. Each of the plurality of valve modules includes a housing in which working elements of the valve module are contained and at least one port in the housing adapted to be an input port or an output port, the at least one port being adapted to cooperate with and be directly fluidly connected to at least one port of another of the plurality of valve modules, thereby obviating the need for tubing or piping. Each of the plurality of valve modules is self-contained and defines a stand-alone unit capable of operating independently of any other of the plurality of valve modules.

19 Claims, 4 Drawing Sheets

(56) References Cited

U.S. PATENT DOCUMENTS

| | | | |
|---|---|---|---|
| D335,526 S * | 5/1993 | Biltoft et al. | D23/233 |
| 5,443,306 A * | 8/1995 | Broome | 303/3 |
| 6,135,574 A | 10/2000 | Pettit et al. | 303/15 |
| 6,495,103 B2 | 12/2002 | Hettinger | 422/68.1 |
| 6,688,325 B2 | 2/2004 | Hettinger | 137/270 |
| 2002/0020445 A1 | 2/2002 | Hettinger | |
| 2004/0018764 A1 | 1/2004 | Thurston | |
| 2004/0141853 A1 * | 7/2004 | Duchet et al. | 417/282 |
| 2004/0187674 A1 * | 9/2004 | Bennett et al. | 91/418 |
| 2006/0284479 A1 * | 12/2006 | Hoover et al. | 303/89 |

FOREIGN PATENT DOCUMENTS

| | | |
|---|---|---|
| JP | 2002071100 A | 3/2002 |
| JP | 2002276837 A | 9/2002 |

\* cited by examiner

MODULAR ELECTRONIC BRAKE VALVE FOR AIR BRAKES VEHICLES

FIELD OF THE INVENTION

The present invention relates to pneumatic brake systems such as those employed in heavy vehicles, and more specifically to control valves used in such systems.

BACKGROUND OF THE INVENTION

The majority of current heavy vehicle brake systems use compressed air to apply the brakes. In such systems, control signals are typically transmitted from the driver of the vehicle to the control valves of the brake system, and the brakes are applied. These types of brakes are generally divided into two categories: service brakes and parking brakes. Service brakes are used primarily to slow the vehicle to a stop when the vehicle is moving. Parking brakes are used primarily for helping to prevent the vehicle from moving from a parked position, and may also be used in an emergency situation to slow a moving vehicle when the service brakes have failed, in order to provide a redundant brake circuit.

For service brakes, an operator generally depresses a brake pedal, which in turn actuates a control valve, allowing air pressure to travel to the brake, and the brake is applied. The parking brake is generally engaged by a vehicle operator by actuating a push/pull hand lever within the cab of the vehicle, located on the vehicle dash. The parking brake is generally a spring brake which is normally engaged, meaning that air pressure must be applied to the parking brake in order to release it. Thus, when there is no air pressure present, the parking brake is applied. Accordingly, if a vehicle loses air pressure (i.e., ruptured hose, failed component, etc.), and thus loses service brake air pressure and the ability to apply the service brakes, the parking brake will automatically engage, and act to slow a moving vehicle. Likewise, when the vehicle is parked and/or not in use, the parking brake can be engaged by the operator, helping to prevent the vehicle from moving from a parked position.

As mentioned above, typical current day heavy vehicles have a push/pull knob located in the cab of the vehicle which is used to engage and disengage the parking brake. A vehicle may have more than one push/pull knob, depending upon whether there is an additional control for the parking brakes on a trailer attached to the vehicle. The push/pull knob is generally connected to a push/pull double check (PPDC) valve, which controls the flow of air to the parking brake. Generally, when an operator pushes the valve in, it acts to provide air pressure to the parking brake, and thus release the brake, allowing the vehicle to move. In order to apply the brake, the operator pulls the push/pull knob, thus removing air pressure from the parking brake and causing it to engage. Generally, when the knob is pushed in, the air pressure acts to engage the knob and keep it in the pushed in position. Such push/pull knobs also have a feature which allows a manual override where, even if there is a failure in the air system, or the air pressure is not high enough to engage the push/pull knob, the operator may manually hold the knob in to disengage the parking brake and move the vehicle a short distance. In more current systems, the in-dash PPDC valve is replaced by a solenoid disposed away from the dash, which solenoid receives electronic control signals from a push button, switch, or the like which is disposed within reach of the vehicle driver (e.g., on the dash of the vehicle).

While many different systems which operate in a manner similar to that described above are known, all known prior art systems suffer from a number of disadvantages. One of such disadvantages relates to the complexity of such systems. Although not fully described above, typical heavy vehicle brake systems do not employ only a PPDC valve, but rather also include several additional components and valves, such as a manifold, an inversion valve, an anti-compounding valve, a relay valve, and possibly others (such as valves used in conjunction with electronic lift axle or steer axle applications, for example). Such systems often require a significant amount of plumbing running in a complex web to connect the various system components. Not only is this large amount of plumbing expensive, heavy and relatively difficult to install (thereby requiring a relatively large amount of time to install), but the potentially long lengths of plumbing between components can lead to delays in achieving required system pressures, such that, for example, parking brake release timing is increased.

These disadvantages have been addressed to some extent in certain prior art systems, such as those disclosed in U.S. Pat. Nos. 4,128,276 and 6,135,574 which disclose combination brake control/valve units having a so-called "modular" configuration. What is meant by "modular" in these prior art references is that various components of the brake control/valve units may be added, removed, swapped, etc. without replacing the entire unit. Thus, for example, if a particular desired functionality is desired, a module for achieving that functionality may be added to the unit. Similarly, if a functionality is not required, the module for achieving that functionality may be removed. Moreover, if a module is damaged or otherwise becomes inoperative, that module may be replaced without requiring replacement of the entire unit.

While such arrangements do provide some benefits over the systems described above which are based upon a plurality of spatially separated valves connected via a network of plumbing, they do suffer from disadvantages of their own. A major disadvantage of such arrangements is that while modules may be separately added to, removed from, or replaced within the core brake control/valve unit, each of the modules does rely on the core unit to operate (i.e., the modules are not standalone units which can operate independently of one another). Thus, for example, suppose that a core brake control/valve unit in accordance with the prior art is designed to be capable of operating ten modules. The core unit would necessarily be sized such that it could receive all ten modules. However, also suppose that based upon the particular application, only two modules are desired. In such a case, a large majority (i.e., eight tenths) of the core unit would be empty and would be taking up space and weight needlessly. The core unit would also likely be much more expensive than necessary. Now suppose that only one module was required for a particular application. Since each module relies upon the core unit to function, the single desired module could not be used by itself, but instead would have to be installed in the core unit, in a very inefficient manner from space, weight and cost standpoints.

What is desired, therefore, is a pneumatic brake system for heavy vehicles which does not require a significant amount of plumbing running in a complex web to connect various system components, which does not require plumbing that is expensive, heavy and relatively difficult to install and which can be installed relatively quickly, which does not suffer from long delays in achieving required system pressures such that parking brake release timing is satisfactory, which includes modular stand-alone components so that components of the system having different functionality may be directly joined together to form an integrated valve unit, and which is scalable and customizable in size as dictated by the application in which the system is to be used.

SUMMARY OF THE INVENTION

Accordingly, it is an object of the present invention to provide a pneumatic brake system for heavy vehicles which does not require a significant amount of plumbing running in a complex web to connect various system components.

Another object of the present invention is to provide a pneumatic brake system for heavy vehicles having the above characteristics and which does not require plumbing that is expensive, heavy and relatively difficult to install and which can be installed relatively quickly.

A further object of the present invention is to provide a pneumatic brake system for heavy vehicles having the above characteristics and which does not suffer from long delays in achieving required system pressures such that parking brake release timing is satisfactory.

Still another object of the present invention is to provide a pneumatic brake system for heavy vehicles having the above characteristics and which includes modular stand-alone components so that components of the system having different functionality may be directly joined together to form an integrated valve unit.

Yet a further object of the present invention is to provide a pneumatic brake system for heavy vehicles having the above characteristics and which is scalable and customizable in size as dictated by the application in which the system is to be used These and other objects are achieved according to one embodiment of the present invention by provision of a vehicle brake system including a source of fluid pressure adapted to supply a braking force to at least one brake actuator and a modular valve unit fluidly coupling the brake actuator to the source of fluid pressure. The modular valve unit includes a plurality of valve modules. Each of the plurality of valve modules includes a housing in which working elements of the valve module are contained and at least one port in the housing adapted to be an input port or an output port, with at least one port being adapted to cooperate with and be directly fluidly connected to at least one port of another of the plurality of valve modules, thereby obviating the need for tubing or piping. Each of the plurality of valve modules is self-contained and defines a stand-alone unit capable of operating independently of any other of the plurality of valve modules.

In some embodiments, the modular valve unit comprises at least one of an inlet fluidly coupled to the source of fluid pressure and an outlet fluidly coupled to the at least one brake actuator. In certain of these embodiments, the modular valve unit comprises both of an inlet fluidly coupled to the source of fluid pressure and an outlet fluidly coupled to the brake actuator. In some embodiments, at least one of the plurality of valve modules further comprises at least one additional port in the housing adapted to be an input port or an output port, the at least one additional port adapted to be fluidly connected to at least one system component via tubing or piping. In some embodiments, each of the plurality of valve modules further comprises an attachment mechanism by which adjacent valve modules are detachably joined together. In some embodiments, at least one of the plurality of valve modules further comprises a mounting mechanism by which the modular valve unit is mountable to the vehicle.

In some embodiments, at least one of the plurality of valve modules comprises an electronic parking solenoid valve module, an inversion valve module or an anti-compounding valve module. In certain of these embodiments, a first of the plurality of valve modules comprises an electronic parking solenoid valve module, a second of the plurality of valve modules comprises an inversion valve module and a third of the plurality of valve modules comprises an anti-compounding valve module. In certain of these embodiments, an output port of the electronic parking solenoid valve module is directly connected to an input port of the anti-compounding valve module, and an output port of the anti-compounding valve module is directly connected to an input port of the inversion valve module when the electronic parking solenoid valve module, the inversion valve module and the anti-compounding valve module are joined together to form the modular valve unit. In certain of these embodiments, an input port of the electronic parking solenoid valve module is connected to the source of fluid pressure. In certain embodiments, an output port of the inversion valve module is connected to the at least one brake actuator. In certain embodiments, the electronic parking solenoid valve module further comprises an electrical connection for receiving electrical control signals from a switch located within the vehicle.

In accordance with another embodiment of the present invention, a vehicle brake system includes a source of fluid pressure adapted to supply a braking force to at least one brake actuator and a modular valve unit fluidly coupling the brake actuator to the source of fluid pressure. The modular valve unit comprises an inlet fluidly coupled to the source of fluid pressure and an outlet fluidly coupled to the brake actuator, and a plurality of valve modules. Each of the plurality of valve modules includes a housing in which working elements of the valve module are contained, at least one port in the housing adapted to be an input port or an output port, the at least one port adapted to cooperate with and be directly fluidly connected to at least one port of another of the plurality of valve modules, thereby obviating the need for tubing or piping, and an attachment mechanism by which adjacent valve modules are detachably joined together. At least one of the plurality of valve modules comprises an electronic parking solenoid valve module, an inversion valve module or an anti-compounding valve module, and each of the plurality of valve modules is self-contained and comprises a stand-alone unit capable of operating independently of any other of the plurality of valve modules.

In some embodiments, at least one of the plurality of valve modules further comprises at least one additional port in the housing adapted to be an input port or an output port, with the at least one additional port adapted to be fluidly connected to at least one system component via tubing or piping. In some embodiments, at least one of the plurality of valve modules further comprises a mounting mechanism by which the modular valve unit is mountable to the vehicle.

In some embodiments, a first of the plurality of valve modules comprises an electronic parking solenoid valve module, a second of the plurality of valve modules comprises an anti-compounding valve module and a third of the plurality of valve modules comprises an inversion valve module. In certain of these embodiments, an output port of the electronic parking solenoid valve module is directly connected to an input port of the anti-compounding valve module, and an output port of the anti-compounding valve module is directly connected to an input port of the inversion valve module when the electronic parking solenoid valve module, the anti-compounding valve and the inversion valve module are joined together to form the modular valve unit. In certain of these embodiments an input port of the electronic parking solenoid valve module is connected to the source of fluid pressure. In certain embodiments, an output port of the inversion valve module is connected to the at least one brake actuator. In certain embodiments, the electronic parking solenoid valve module further comprises an electrical connection for receiving electrical control signals from a switch located within the vehicle.

In accordance with a further embodiment of the present invention, a modular valve unit adapted to be fluidly coupled between a brake actuator and a source of fluid pressure within a vehicle brake system includes a plurality of valve modules. Each of the plurality of valve modules includes a housing in which working elements of the valve module are contained, at least one port in the housing adapted to be an input port or an output port, the at least one port adapted to cooperate with and be directly fluidly connected to at least one port of another of the plurality of valve modules, thereby obviating the need for tubing or piping, and an attachment mechanism by which adjacent valve modules are detachably joined together. Each of the plurality of valve modules is self-contained and comprises a stand-alone unit capable of operating independently of any other of the plurality of valve modules.

The invention and its particular features and advantages will become more apparent from the following detailed description considered with reference to the accompanying drawings.

DETAILED DESCRIPTION OF AN
EMBODIMENT OF THE INVENTION

Figure 1:
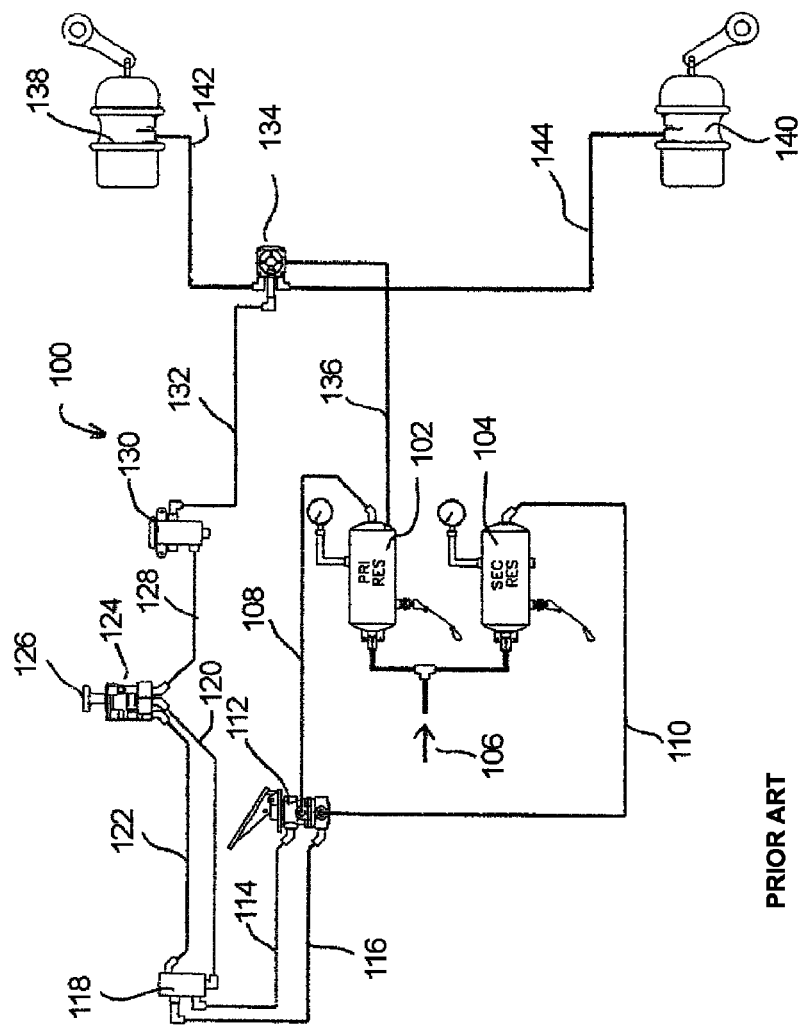
FIG. 1 is a schematic view of a typical prior art pneumatic brake system for heavy vehicles.

Referring first to FIG. 1, a typical prior art pneumatic brake system 100 for heavy vehicles is shown. The system 100 includes a primary pressurized air supply reservoir 102 and a secondary pressurized air supply reservoir 104, both of which receive pressurized air from a pressurized air source (indicated by arrow 106), which typically takes the form of a compressor. Primary and secondary pressurized air supply reservoirs 102, 104 are connected via conduits 108, 110 to a brake pedal 112 which is disposed within the cab of the vehicle, typically within easy reach of the foot of the vehicle's driver.

Brake pedal 112 is connected via conduits 114, 116 to a manifold 118, which in turn is connected via conduits 120, 122 to a push/pull double check (PPDC) valve 124, which typically includes a push/pull hand lever 126 within the cab of the vehicle, typically located on the vehicle dash within reach of the driver. PPDC valve 124 is connected, via conduit 128 to an inversion valve 130, which is in turn connected via conduit 132 to a relay valve 134. Relay valve 134 is also connected directly to primary pressurized air supply reservoir 104 via conduit 136. Relay valve 134 is also connected to two brake actuators 138, 140 via conduits 142, 144.

Brake actuators 138, 140 are typical dual chamber actuators which include a service brake chamber and a parking (or emergency) brake chamber. By actuating the brake pedal 112, the driver causes pressurized air to be directed to the service brake chambers of the brake actuators 138, 140 such that the service brakes are applied to slow the vehicle to a stop when the vehicle is moving. By actuating the push/pull hand lever 126 of the push/pull double check (PPDC) valve 124, the driver causes pressurized air to be directed to the parking brake chambers of the brake actuators 138, 140 such that the parking brakes (which are usually biased to the applied position) are released and the vehicle is free to move.

Because the configuration and operation of systems of the type shown in FIG. 1 are extremely well known, further details thereof are not provided herein. However, as should be apparent to those skilled in the art, it is work noting that prior art system 100 includes four separate valve elements (manifold 118, PPDC valve 124, inversion valve 130 and relay valve 134), which are connected together by a number of conduits 120, 122, 128, 132.

Figure 2:
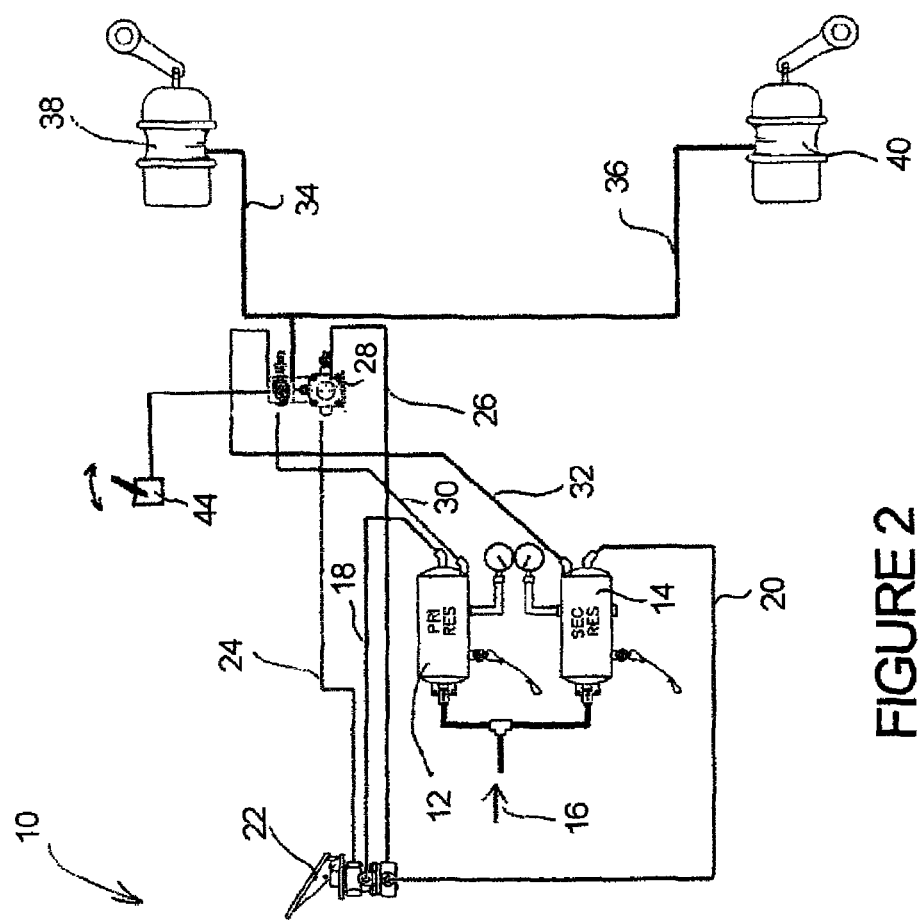
FIG. 2 is a schematic view of a pneumatic brake system for heavy vehicles in accordance with an embodiment of the present invention.

Referring now to FIG. 2, a pneumatic brake system 10 for heavy vehicles in accordance with an embodiment of the present invention is shown. The system 10 includes a primary pressurized air supply reservoir 12 and a secondary pressurized air supply reservoir 14, both of which receive pressurized air from a pressurized air source (indicated by arrow 16), which typically takes the form of a compressor. Primary and secondary pressurized air supply reservoirs 12, 14 are connected via conduits 18, 20 to a brake pedal 22 which is disposed within the cab of the vehicle, typically within easy reach of the foot of the vehicle's driver.

Brake pedal 22 is connected via conduits 24, 26 to one or more inlets of a modular valve unit 28, which also has one or more inlets which are directly connected to primary pressurized air supply reservoir 14 and secondary pressurized air supply reservoir 16 via conduits 30, 32. Modular valve unit 28 also includes one or more outlets which are connected via conduits 34, 36 to two brake actuators 38, 40, which are typical dual chamber actuators which include a service brake chamber and a parking (or emergency) brake chamber. A switch 44 (typically located on the dash of the vehicle within easy reach of the driver) is coupled to modular valve unit 28, the switch providing for switching the parking brake on/off thus performing the function of a push/pull double check (PPDC) valve. It should be understood that, as explained in more detail below, modular valve unit 28 shown in FIG. 2 performs the functions of a push/pull double check (PPDC) valve, an inversion valve, and an anti-compounding valve because that is what is required of modular valve unit 28 by system 10. However, if system 10 were varied such that different functionality was required of modular valve unit 28, such could be achieved by varying which modules were joined together to form modular valve unit 28.

Figure 3:
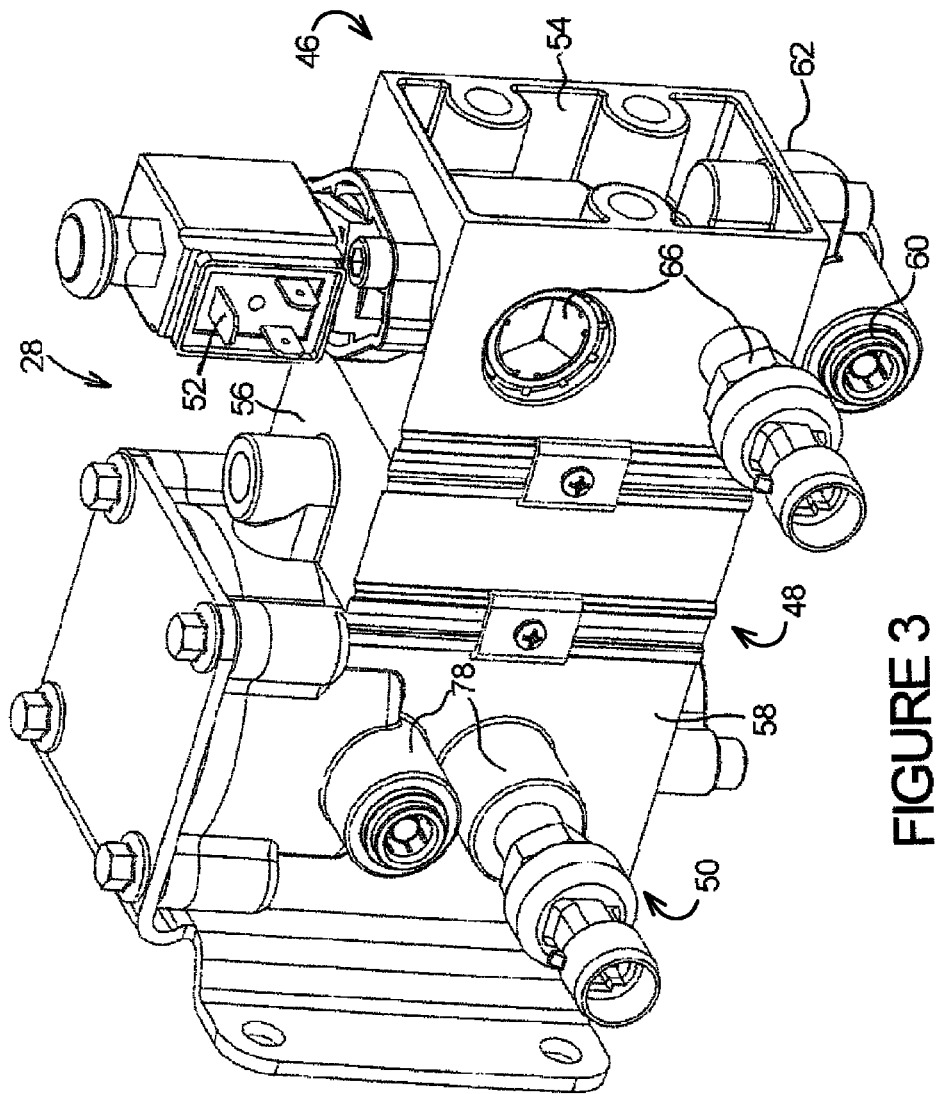
FIG. 3 is a front isometric view showing in greater detail an embodiment of a modular valve unit for use with the pneumatic brake system for heavy vehicles of FIG. 2.
Figure 4:
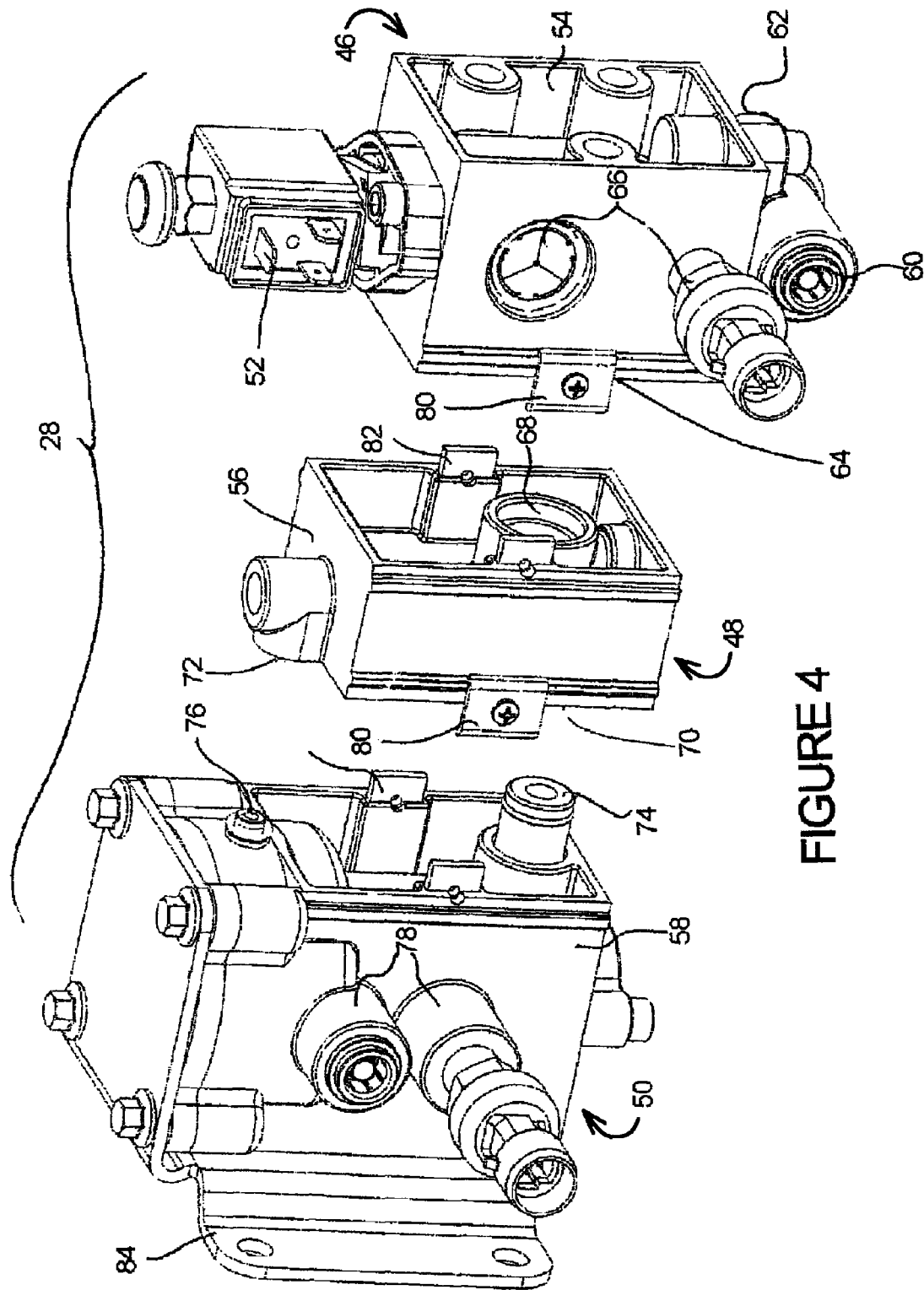
FIG. 4 is a front isometric exploded view showing the embodiment of a modular valve unit of FIG. 3.

Referring now to FIGS. 3 and 4, modular valve unit 28 as shown in FIG. 2 comprises an electronic parking solenoid valve module 46 (which replaces the traditional PPDC valve), an anti-compounding valve module 48 and an inversion valve module 50. Each of the valve modules functions in a manner similar to its corresponding non-modular corresponding counterpart, and therefore a detailed description of the internal workings of each valve module is not provided herein. Rather, only the novel aspects of the modules are described in detail.

Electronic parking solenoid valve module 46 is responsive to electrical signals received from a switch (not shown, but typically located on the dash of the vehicle within easy reach of the driver) to move from one position in which the parking brake chambers of the brake actuators 38, 40 are fluidly coupled to at least one of the primary pressurized air supply reservoir 14 and/or the secondary pressurized air supply reservoir 16 in order to pressurize the parking brake chambers and release the parking brakes, and another position in which the parking brake chambers of the brake actuators are vented in order to exhaust pressure within the parking brake chamber so that the parking brake is applied. Thus, electronic parking solenoid valve module 46 and the switch (not shown) are used to replace the PPDC valve of the known prior art shown in FIG. 1. Electronic parking solenoid valve module 46 includes an electrical connector 52 for facilitating the electrical connection to the remotely located switch.

Similarly, anti-compounding valve module 48 and inversion valve module 50 perform substantially the same functions as those corresponding non-modular counterparts which are already known in the prior art.

Electronic parking solenoid valve module 46 includes a housing 54 in which the working elements of module 46 are contained, anti-compounding valve module 48 includes a housing 56 in which the working elements of module 48 are contained and inversion valve module 50 includes a housing 58 in which the working elements of module 50 are contained. Each of housings 54, 56, 58 include various pneumatic inputs and outputs by which modules 46, 48, 50 may be connected to other modules and/or other, non-modular brake system components. In this manner, each of electronic parking solenoid valve module 46, anti-compounding valve module 48 and inversion valve module 50 is completely self contained. Each may be used in conjunction with other modular components, and/or or each may be used in conjunction with other brake system components which are not modular.

For example, electronic parking solenoid valve module 46 may include inputs 60, 62 for being connected to primary and secondary pressurized air supply reservoirs 12, 14 and an output (not visible in the Figures, but located in the vicinity indicated by dashed line 64) for connection to another modular component of modular valve unit 28, in this case anti-compounding valve module 48. Electronic parking solenoid valve module 46 may also include additional inputs and/or outputs 66 for connection to non-modular components of system 10 in addition to or instead of being connected to other modular components of modular valve unit 28, and an exhaust flapper 67 through which air may be exhausted as necessary.

Similarly, anti-compounding valve module 48 includes an input 68 for being connected to the output (not visible in the Figures, but located in the vicinity indicated by dashed line 64) of electronic parking solenoid valve module 46 and one or more outputs (not visible in the Figures, but located in the vicinity indicated by dashed lines 70, 72) for connection to another modular component of modular valve unit 28, in this case inversion valve module 50.

Inversion valve module 50 may include inputs 74, 76 for being connected to the outputs (not visible in the Figures, but located in the vicinity indicated by dashed lines 70, 72) of anti-compounding valve module 56 as well as additional inputs and/or outputs 78 for connection to non-modular components of system 10, such as foot valve 22, in addition to or instead of being connected to other modular components of modular valve unit 28. Inversion valve module 50 may include a pressure transducer which may be used (via input 79) to measure supply pressure to the brake actuators.

For facilitating use with other modular components, the housing 54, 56, 58 of each module 46, 48, 50 includes an attachment member 80, 82 which mates with and is detachably joined to a corresponding attachment member 80, 82 of an adjacent modular component. The housing 54, 56, 58 of at least one of modules 46, 48, 50 may also include a mounting member 84 such that the modular valve unit 28 may be attached to the vehicle.

The inputs and outputs of each modular component which are intended to cooperate with and be fluidly connected to other modular components are sized, shaped and positioned to achieve such cooperation and connection directly with one another (i.e., without requiring the use of intermediate connection tubes or piping) when the modular components are joined together via attachment members 80, 82. Thus, output 64 of electronic parking solenoid valve module 46 is directly connected to input 68 of anti-compounding valve module 48, and outputs 70, 72 of anti-compounding valve module 48 are directly connected to inputs 74, 76 of inversion valve module 50 when the modules 46, 48, 50 are joined together to form modular valve unit 28.

In the manner described above, each of electronic parking solenoid valve module 46, anti-compounding valve module 48 and inversion valve module 50 could be used as a stand-alone component of a brake system apart from one another, or each could be directly connected to one or more other modules to form modular valve unit 28. In this way, modular valve unit 28 is completely customizable and scalable as dictated by the environment in which it is to be used.

The present invention, therefore, provides a pneumatic brake system for heavy vehicles which does not require a significant amount of plumbing running in a complex web to connect various system components, which does not require plumbing that is expensive, heavy and relatively difficult to install and which can be installed relatively quickly, which does not suffer from long delays in achieving required system pressures such that parking brake release timing is satisfactory, which includes modular stand-alone components so that components of the system having different functionality may be directly joined together to form an integrated valve unit, and which is scalable and customizable in size as dictated by the application in which the system is to be used.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A modular electronic brake system located within a moving vehicle, the brake system comprising:
    a source of fluid pressure adapted to supply a braking force to at least one brake actuator; and
    a modular valve unit fluidly coupling the brake actuator to said source of fluid pressure, said modular valve unit including an electronic parking solenoid valve module, an anti-compounding valve module and an inversion valve module, each of the valve modules including:
        a housing including a monolithic structure within which working elements of the valve module are contained;
        at least one port in said housing adapted to be an input port or an output port, the at least one port is directly fluidly connected to at least one port of another of the valve modules without piping or any fluid connection mechanism;
        an attachment member positioned on an exterior of and extending from said housing for mating with a corresponding attachment member on another modular valve unit; and
    wherein each of the valve modules is self-contained and is a stand-alone unit operating independently of a manifold or any other of the plurality of valve modules;
    wherein at least one of the valve modules further comprises a mounting member coupled to the housing of said at least one of the valve modules, such that the modular valve unit is detachably connected to the vehicle.

2. The system of claim 1 wherein said modular valve unit further comprises at least one of an inlet fluidly coupled to the source of fluid pressure and an outlet fluidly coupled to the at least one brake actuator.

3. The system of claim 2 wherein said modular valve unit further comprises both of an inlet fluidly coupled to the source of fluid pressure and an outlet fluidly coupled to the brake actuator.

4. The system of claim 1 wherein at least one of the valve modules further comprises at least one additional port in said housing adapted to be an input port or an output port, the at least one additional port adapted to be fluidly connected to at least one system component via tubing or piping.

5. The system of claim 1 wherein each of the valve modules further comprises an attachment mechanism by which adjacent valve modules are detachably joined together.

6. The system of claim 1 wherein an output port of the electronic parking solenoid valve module is directly connected to an input port of the anti-compounding valve module, and an output port of the anti-compounding valve module is directly connected to an input port of the inversion valve module when the electronic parking solenoid valve module, the anti-compounding valve module and the inversion valve module are joined together to form said modular valve unit.

7. The system of claim 6 wherein an input port of the electronic parking solenoid valve module is connected to the source of fluid pressure.

8. The system of claim 6 wherein an output port of the inversion valve module is connected to the at least one brake actuator.

9. The system of claim 6 wherein the electronic parking solenoid valve module further comprises an electrical connection for receiving electrical control signals from a switch located within the vehicle.

10. The system of claim 1 wherein said attachment member comprises a protrusion positioned on an exterior of said housing.

11. A modular electronic brake system located within a moving vehicle, the brake system comprising:
    a source of fluid pressure adapted to supply a braking force to at least one brake actuator; and
    a modular valve unit fluidly coupling the brake actuator to said source of fluid pressure, said modular valve unit comprising an inlet fluidly coupled to the source of fluid pressure and an outlet fluidly coupled to the brake actuator, and an electronic parking solenoid valve module, an anti-compounding valve module and an inversion valve module, each of the valve modules comprising:
        a housing comprising a monolithic structure within which working elements of the valve module are contained;
        at least one port in said housing adapted to be an input port or an output port, the at least one port is directly fluidly connected to at least one port of another of the valve modules without piping or any fluid connection mechanism;
        an attachment member positioned on an exterior of and extending from said housing for mating with a corresponding attachment member on another modular valve unit;
    wherein each of the valve modules is self-contained and comprises a stand-alone unit operating independently of a manifold or any other of the valve modules;
    wherein at least one of the valve modules further comprises a mounting member coupled to the housing of said at least one of the valve modules, such that the modular valve unit is detachably connected to the vehicle.

12. The system of claim 11 wherein at least one of the valve modules further comprises at least one additional port in said housing adapted to be an input port or an output port, the at least one additional port adapted to be fluidly connected to at least one system component via tubing or piping.

13. The system of claim 12 wherein an output port of the electronic parking solenoid valve module is directly connected to an input port of the anti-compounding valve module, and an output port of the anti-compounding valve module is directly connected to an input port of the inversion valve module when the electronic parking solenoid valve module, the anti-compounding valve module and the inversion valve module are joined together to form said modular valve unit.

14. The system of claim 13 wherein an input port of the electronic parking solenoid valve module is connected to the source of fluid pressure.

15. The system of claim 13 wherein an output port of the inversion valve module is connected to the at least one brake actuator.

16. The system of claim 13 wherein the electronic parking solenoid valve module further comprises an electrical connection for receiving electrical control signals from a switch located within the vehicle.

17. The system of claim 11 wherein said attachment member comprises a protrusion positioned on an exterior of said housing.

18. A modular valve unit adapted to be fluidly coupled between a brake actuator and a source of fluid pressure within a modular electronic brake system located within a moving vehicle, said modular valve unit comprising an electronic parking solenoid valve module, an anti-compounding valve module and an inversion valve module, each of the valve modules comprising:
    a housing comprising a monolithic structure within which working elements of the valve module are contained;
    at least one port in said housing adapted to be an input port or an output port, the at least one port is directly fluidly connected to at least one port of another of the valve modules without piping or any fluid connection mechanism; and
    an attachment member positioned on an exterior of and extending from said housing for mating with a corresponding attachment member on another modular valve unit; and
    wherein each of the valve modules is self-contained and comprises a stand-alone unit operating independently of a manifold or any other of the valve modules;
    wherein at least one of the valve modules further comprises a mounting member coupled to the housing of said at least one of the valve modules, such that the modular valve unit is detachably connected to the vehicle.

19. The system of claim 18 wherein said attachment member comprises a protrusion positioned on an exterior of said housing.

* * * * *